United States Patent
Schererz

(10) Patent No.: US 6,186,312 B1
(45) Date of Patent: Feb. 13, 2001

(54) APPARATUS FOR TURNING FLAT SHIPMENTS

(75) Inventor: Holger Schererz, Rehfelde (DE)

(73) Assignee: Siemens Aktiengesellschaft, Munich (DE)

(*) Notice: Under 35 U.S.C. 154(b), the term of this patent shall be extended for 0 days.

(21) Appl. No.: 09/219,462

(22) Filed: Dec. 23, 1998

(30) Foreign Application Priority Data

Dec. 23, 1997 (DE) .............................................. 197 57 717

(51) Int. Cl.$^7$ .............................. B65G 47/24; B65G 15/10
(52) U.S. Cl. .......................... 198/406; 198/416; 198/817
(58) Field of Search .................................. 198/416, 406, 198/408, 817

(56) References Cited

U.S. PATENT DOCUMENTS

| | | | |
|---|---|---|---|
| 2,015,187 | * 9/1935 | Mayer | 198/416 |
| 3,786,908 | * 1/1974 | Jones | 198/416 |
| 4,122,938 | * 10/1978 | Walz et al. | 198/416 |
| 4,832,179 | * 5/1989 | Simmons | 198/817 |
| 5,027,944 | * 7/1991 | Damkjaer | 198/408 |
| 5,544,733 | * 8/1996 | Shaver | 198/408 |
| 5,609,237 | * 3/1997 | Lenhart | 198/406 |

FOREIGN PATENT DOCUMENTS

| | | |
|---|---|---|
| 2943260A1 | 5/1981 | (DE) . |
| 4127207A1 | 2/1993 | (DE) . |
| 4412979A1 | 10/1995 | (DE) . |

\* cited by examiner

Primary Examiner—Dean J. Kramer
Assistant Examiner—Bryan Jaketic
(74) Attorney, Agent, or Firm—Venable; George H. Spencer

(57) ABSTRACT

The invention relates to an apparatus for turning flat shipments, which are delivered in succession standing on their short sides by a conveyor system, into a recumbent position, without interrupting the conveying. According to the invention, the apparatus has a driven under-floor belt (1) with a low coefficient of friction, which on one side has a projection (5) with a higher coefficient of friction. Located next to the under-floor belt (1) on the side without a projection is a side belt (2), which is positioned obliquely outward and is driven at the same speed as the under-floor belt (1) and likewise has a low coefficient of friction. Downstream thereof in the conveying direction is a conveyor belt (3), whose bearing face together with the bearing face of the under-floor belt (1) defines a plane; the under-floor belt (1) and the conveyor belt (3) are disposed and/or embodied such that the air cushion that forms when the shipments drop is quickly dissipated. Next to the under-floor belt (1), on the side with the projection (5), is a guide device (4), facing the side belt (2), for tipping the shipments onto the side belt (2).

7 Claims, 1 Drawing Sheet

APPARATUS FOR TURNING FLAT SHIPMENTS

CROSS-REFERENCE TO RELATED APPLICATION

This applications claims the right of priority of Application No. 19757717.2 filed in Germany on Dec. 23, 1997, the subject of which application is incorporated herein by reference.

BACKGROUND OF THE INVENTION

The invention relates to an apparatus for turning flat shipments, which are delivered in succession standing on their short sides by a conveyor system, into a recumbent position without interrupting the conveying.

In sorting machines, the shipments are separated out from a stack in the inlet portion. To keep the size of the stack from affecting the payout quality, the stack reaches a horizontally oriented feeder bed, where the shipments stand on their short side. The shipments are then paid out in the upright position. In order the distribute the shipments subsequently to an optimal number of sorting compartment while requiring little machine space, it is advantages to stack the shipments in a recumbent position. This makes it possible to place a plurality of compartments one above the other.

It therefore follows that the shipments, during their travel through the sorting machine, much be changed from the position in which they stand on their short sides into a recumbent position. This task is accomplished in an apparatus for turning the shipments. The shipments undergo a rotation about their longitudinal axis by an amount between 90° and 70°, depending on whether the shipments in their recumbent position are oriented horizontally or in sloping fashion.

Embodiments in which the shipments are clamped between driven belts and conveyed through the sorting machine are known. For turning, the belts are correspondingly twisted. This procedure has stood the test of time for post cards and standard-sized letters. For handling a wider range of shipments, however, from thin, lightweight post cards to heavy, large envelopes, however, this principle cannot assure reliable, space-saving operation. This is because belt clamping does not assure secure, nonslip conveyance of the heavy shipments, and if a thick shipment is followed by a thin one, the latter will not be grasped tightly enough by the belts that are still spread apart. This effect could be avoided only with very long spacings between shipments.

A turning apparatus would thus have to be very long, with unusually long gaps between shipments, making the machine less productive. One way of avoiding or lessening these disadvantages has become known in which the twisted belts are additionally pressed together by spring-supported rollers. This is complicated and does not assure reliable function, since the rollers affect belt travel, and the belt travel has to be compensated for via a control roller.

BRIEF DESCRIPTION OF THE INVENTION

The object of the invention defined by claim 1 is therefore to create an apparatus with a short structural length for securely turning shipments, which can be either thin and lightweight or thick and heavy, from a position in which they stand on their short side into a recumbent position during conveyance at medium speed, by rotating them about their longitudinal axis.

The purposeful tipping and orientation of the shipments, with minimal shifts in the gaps between them, makes a functionally reliable apparatus with a relatively short structural length possible at little expense for equipment.

Advantageous embodiments of the invention are defined by the other claims. Claims 2 and 3 state that the air cushion that forms when the shipments drop is advantageously dissipated quickly by means of a large enough gap between the conveyor belt and the under-floor belt, and/or by means of holes in the conveyor belt and/or the under-floor belt.

To improve slaving, it is advantageous according to claim 4 to use a driven endless belt in the apparatus, including in the guide device.

If the shipments are speeded up after being turned, then it is advantageous according to claim 5 to embody the conveyor belt with a low coefficient of friction as well, so that the acceleration process is not hindered if some shipment items are still on the conveyor belt.

According to claim 6, when the shipments arrive normally the side belt protruding obliquely outward advantageously extends parallel to the under-floor belt. If additional orientation provisions are needed for the shipments as they arrive, then according to claim 7 the side belt extends at an acute angle to the under-floor belt.

The invention will be described in further detail below in terms of an exemplary embodiment, in conjunction with the drawing.

DETAILED DESCRIPTION OF THE PREFERRED EMBODIMENTS

Figure 1:
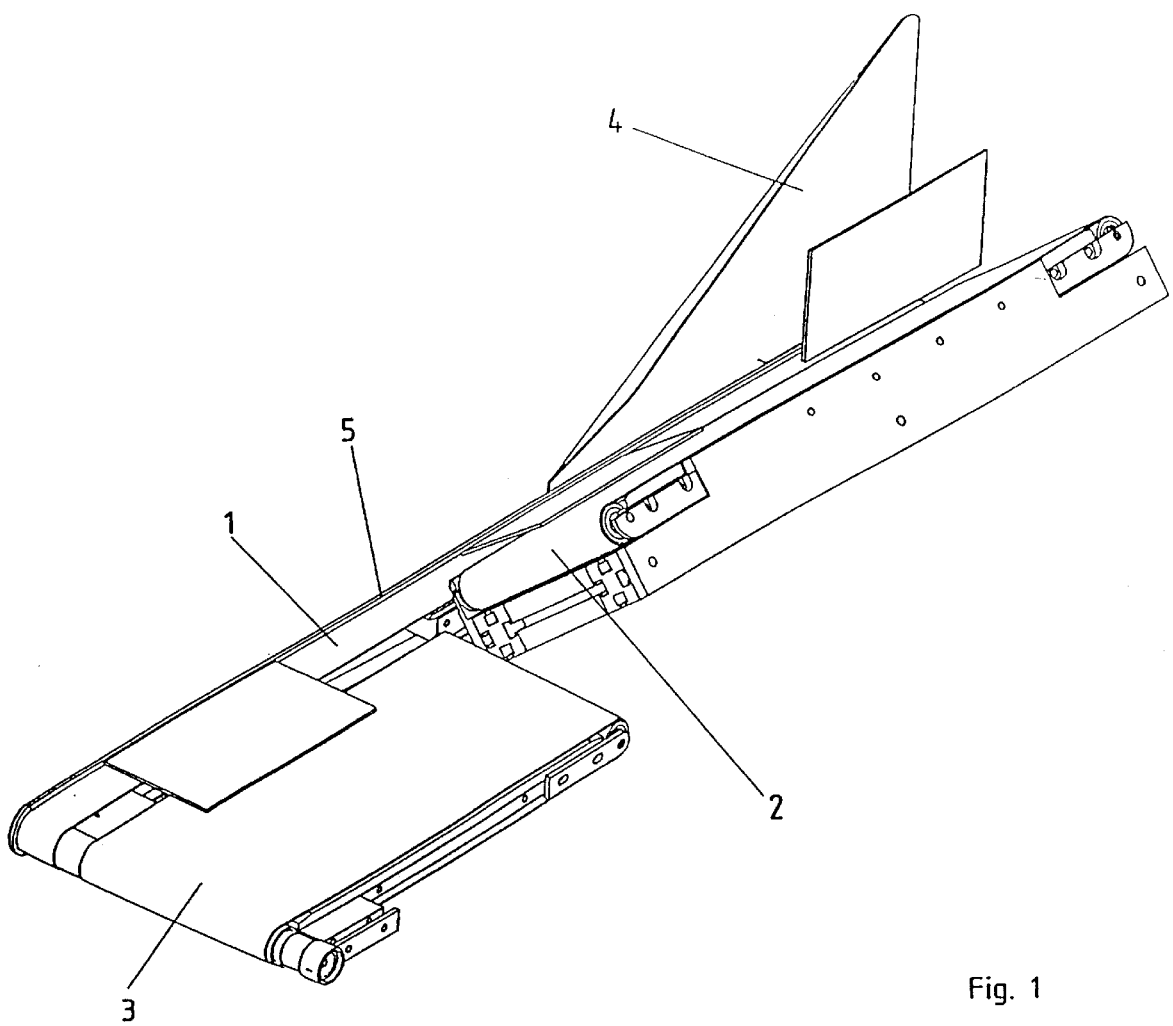
FIG. 1 is a perspective view showing the apparatus of the invention.

The turning apparatus includes a continuous under-floor belt 1, a side belt 2 positioned obliquely outward by approximately 40 to 45°, a conveyor belt 3 disposed downstream of the side belt in the conveying direction and extending at its outlet parallel to the under-floor belt 1, and a guide device 4 that is needed for tipping the shipment.

The shipment is taken on at the inlet of the conveyor system and in this position, because it is no longer supported at the sides, can tip over to either the right or the left. In the machine described above, the shipments arrive in an 8° oblique position dictated by a module preceding what is shown here. (However, this exact position is not absolutely necessary.) They are therefore predominantly in the preferential direction for turning. Shipments that do not move on their own into this preferential direction are brought into that position by the guide device 4. The guide device 4 can be a guide baffle with a low coefficient of friction (a passive guide baffle), which deflect the shipment during conveying and tip it in the preferential direction. In equipment in which the absence of slip is important, the guide device can also be embodied (actively) as a belt.

The shipment thus tips laterally onto the side belt 4, so that instead of being borne by the under-floor belt 1 it is borne by the side belt 2. Since both the side belt 2 and the under-floor belt 1 have a relatively low coefficient of friction, the shipment will slide down (orientation effect) until it meets the projection 5 provided laterally on the under-floor belt 1.

At least the projection boundary, which is approximately perpendicular to the bearing face of the under-floor belt 1, has a higher coefficient of friction than the under-floor belt 1 and the side belt 2, and is primarily responsible, over the further course of the turning process, for good slaving of the shipments. Once the shipment has moved past the side belt 2, it falls over by its own weight for the remaining 40 to 45° until it is resting on the horizontal conveyor belt 3. This assures that despite the air cushion that briefly forms above the conveyor belt 3, the shipment will not slide off or down the air cushion but instead will rest on the boundary of the projection 5.

For dissipating the air cushion, a gap for faster dissipation of the air cushion is located between the under-floor belt 1 and conveyor belt 3, which extend parallel to one another. A perforation (holes) in the conveyor belt 3 and/or the under-floor belt 1 is equally possible. These provisions, at low to medium conveying speeds up to approximately 1 meter per second, achieve reliable turning of the shipment while taking up little space, with sufficiently slight shifting of the gap, and with high-quality orientation.

The conveyor belt 3 also has a low coefficient of friction, because the shipments are thereafter speeded up, and the acceleration process is not meant to be hindered if some shipment items are still located on the conveyor belt 3. The apparatus described can be used for a medium speed up to approximately 1.5 meters per second.

What is claimed is:

1. An apparatus for turning flat shipments, which are delivered in succession standing on their short sides by a conveyor system, into a recumbent position, comprising a driven under-floor belt (1) with a low coefficient of friction, which on a lateral edge has a projection (5) with a boundary virtually perpendicular to the bearing face of the under-floor belt, the boundary having a coefficient of friction higher than that of the under-floor belt, a side belt (2), positioned obliquely outward laterally on the under-floor belt (1) on the side without a projection, the side belt having a low coefficient of friction and being driven at the same speed as the under-floor belt (1), a guide device (4), disposed laterally on the under-floor belt (1) on the side with the projection (5), facing the obliquely positioned side belt (2), the guide device tipping the shipments onto the obliquely positioned side belt (2) and exerting at most only slight forces, counter to the slaving forces, on the shipments, and a conveyor belt (3) disposed downstream of the obliquely positioned side belt (2) in terms of the conveying direction, next to the under-floor belt (1), the bearing face of the conveyor belt defining a plane together with the bearing face of the under-floor belt (1), and the under-floor belt (1) and the conveyor belt (3) are disposed and/or embodied such that the air cushion that forms when the shipments drop is quickly dissipated.

2. The apparatus of claim 1, wherein there is a gap between the conveyor belt (3) and the under-floor belt (1) that is wide enough that the air cushion that forms when the shipments drop is quickly dissipated.

3. The apparatus of claim 1, wherein there are holes in the conveyor belt (3) and/or the under-floor belt (1) for rapid dissipation of the air cushion that forms when the shipments drop.

4. The apparatus of claim 1, wherein the guide device (4) is embodied as a suitably disposed and shaped endless belt driven at the same speed as the under-floor belt (1).

5. The apparatus of claim 1, wherein the conveyor belt (3) also has a low coefficient of friction.

6. The apparatus of claim 1, wherein the side belt (2) positioned obliquely outward extends parallel to the under-floor belt (1).

7. The apparatus of claim 1, wherein the side belt (2) positioned obliquely outward extends at an acute angle to the under-floor belt (1).

* * * * *